United States Patent [19]

Yasumura et al.

[11] Patent Number: 5,732,186

[45] Date of Patent: Mar. 24, 1998

[54] IMAGE SIGNAL RECORDING/REPRODUCING APPARATUS HAVING SPECIAL-EFFECTS-PROCESSING CAPABILITY

[75] Inventors: Hiroto Yasumura; Masahide Hirasawa; Minoru Noji, all of Kanagawa-ken; Susumu Kozuki, Tokyo; Koji Takahashi, Kanagawa-ken; Katsuji Yoshimura, Kanagawa-ken; Tomohiko Sasatani, Kanagawa-ken, all of Japan

[73] Assignee: Canon Kabushiki Kaisha, Tokyo, Japan

[21] Appl. No.: 343,616

[22] Filed: Nov. 22, 1994

Related U.S. Application Data

[63] Continuation of Ser. No. 236,234, May 2, 1994, abandoned, which is a continuation of Ser. No. 962,027, Oct. 15, 1992, abandoned, which is a continuation of Ser. No. 544,036, Jun. 26, 1990, abandoned, which is a continuation of Ser. No. 63,620, Jun. 16, 1987, abandoned.

[30] Foreign Application Priority Data

| Jun. 20, 1986 | [JP] | Japan | 61-94475 U |
| May 14, 1987 | [JP] | Japan | 62-117604 |
| May 14, 1987 | [JP] | Japan | 62-117605 |

[51] Int. Cl.$^6$ .............................. H04N 5/76; H04N 5/225
[52] U.S. Cl. .............................. 386/117; 348/239; 348/578
[58] Field of Search .............................. 358/310, 311, 358/330, 335, 906, 909, 22, 182, 183, 324, 909.1; 360/14.1, 33.1; 348/578, 584, 586, 594, 595, 239–240; 386/1, 4, 38, 46, 117–121, 52

[56] References Cited

U.S. PATENT DOCUMENTS

| 3,812,286 | 5/1974 | Tkacenko | 358/183 |
| 3,833,758 | 9/1974 | Ferrari | 358/906 X |
| 4,086,619 | 4/1978 | Miyake et al. | 358/183 |
| 4,178,613 | 12/1979 | Takahashi et al. | 358/183 |
| 4,199,788 | 4/1980 | Tsujimura | 358/183 |
| 4,199,790 | 4/1980 | Greenfield et al. | 358/183 X |
| 4,249,211 | 2/1981 | Baba et al. | 358/183 |
| 4,257,066 | 3/1981 | Kaneko et al. | 358/183 |
| 4,363,033 | 12/1982 | Lovely | 358/183 X |
| 4,395,733 | 7/1983 | Elenbaas | 358/183 |
| 4,507,689 | 3/1985 | Kozuki et al. | 358/906 X |
| 4,530,015 | 7/1985 | Yanagida et al. | 358/906 X |
| 4,539,601 | 9/1985 | Komine | 358/906 X |
| 4,609,947 | 9/1986 | Yamagiwa et al. | 358/906 X |
| 4,668,997 | 5/1987 | Nagano et al. | 358/330 X |
| 4,712,130 | 12/1987 | Casey | 358/183 X |
| 4,724,476 | 2/1988 | Nakagawa et al. | 358/310 X |
| 4,729,028 | 3/1988 | Micic et al. | 358/183 |
| 4,739,406 | 4/1988 | Morton et al. | 358/183 |
| 4,750,038 | 6/1988 | Welles et al. | 358/183 |
| 4,751,579 | 6/1988 | Okunishi et al. | 358/183 |
| 4,754,340 | 6/1988 | Nakagawa et al. | 358/310 X |
| 4,768,083 | 8/1988 | Romesburg | 358/183 X |
| 4,768,095 | 8/1988 | Wada et al. | 358/183 |
| 4,769,707 | 9/1988 | Kamise et al. | 358/183 X |
| 4,777,531 | 10/1988 | Hakamada et al. | 358/183 |
| 4,779,135 | 10/1988 | Judd | 358/183 |
| 4,780,763 | 10/1988 | McFetridge et al. | 358/183 |
| 4,782,392 | 11/1988 | Haycock et al. | 358/183 |
| 4,985,781 | 1/1991 | Hirasawa | 358/324 |
| 5,099,364 | 3/1992 | Kawabata | 358/906 |
| 5,159,462 | 10/1992 | Yasumura et al. | 358/906 |
| 5,461,485 | 10/1995 | Nagashima et al. | 358/335 |

Primary Examiner—Thai Tran
Attorney, Agent, or Firm—Robin, Blecker, Daley and Driscoll

[57] ABSTRACT

A video signal reproducing apparatus is arranged to use a first video signal which corresponds to an image sensed state of an object and is obtained by sensing the object's image and a second video signal which is reproduced from a record bearing medium; and to form and produce at least one picture plane portion of a third video signal which includes and has the first and second video signals mixed therein in a time sharing manner.

17 Claims, 10 Drawing Sheets

IMAGE SIGNAL RECORDING/ REPRODUCING APPARATUS HAVING SPECIAL-EFFECTS-PROCESSING CAPABILITY

This is a continuation application under 37 CFR 1.62 of prior application Ser. No. 08/236,234, filed May 2, 1994, now abandoned, which is a continuation application under 37 CFR 1.62 of prior application Ser. No. 07/962,027, filed Oct. 15, 1992, now abandoned, which is a continuation of Ser. No. 07/544,036 filed Jun. 26, 1990, now abandoned, which is a continuation of Ser. No. 07/063,620 filed Jun. 16, 1987, now abandoned.

BACKGROUND OF THE INVENTION

1. Field of the Invention

This invention relates to an apparatus for reproducing a video signal.

2. Description of the Related Art

Apparatuses of the kind consisting of a video camera and a video tape recorder (hereinafter referred to as VTR) have been known and called camera-combined type VTRs. The camera-combined type VTR has been generally arranged to have optical information on an object imaged on the image pickup plane of an image sensor via an optical system, such as lenses, within the video camera part. Then, this image is photo-electric converted into a video signal corresponding to the optical image of the object. The video signal is either supplied to a display device of a television set for display or to the VTR part of the camera-combined type VTR for recording on a recording medium such as a magnetic tape or the like. The video signal thus recorded on the medium is also arranged to be reproducible by the VTR for display by the display device. To perform these functions, the camera-combined type VTR has been provided with three discrete signal processing circuit systems, including a signal processing circuit system of the camera part and a recording signal processing circuit system and a reproducing signal processing circuit system of the VTR part. These signal processing circuits are discretely operated as the above stated functions of the VTR are called for.

The conventional camera-combined type VTR is considered to be a very inefficient system because of the discrete use of three signal processing circuit systems. More specifically, the signal processing circuit system of the camera part is used alone in case that a video signal obtained by the camera part is to be displayed at the display device. Both the signal processing circuit system of the camera part and the recording signal processing circuit system of the VTR part are used in case that the video signal obtained by the camera part is to be recorded on a recording medium. The recording signal processing circuit system is alone used in the event of recording on a recording medium a video signal obtained from an external apparatus such as a TV tuner. Further, the reproducing signal processing circuit system of the VTR part is alone used in reproducing a video signal from a recording medium. It is only in the event of a recording operation using the camera part that a plurality of signal processing circuit systems are to be used. Therefore, the conventional camera-combined type VTR has been incapable of efficiently performing varied functions with the three signal processing circuit systems.

Further, the conventional camera-combined type VTR is arranged to form a TV signal of, for example, the NTSC color system by the camera part and to record it on a magnetic tape by the recording system of the VTR part. In other words, in the conventional camera-combined type VTR, the video camera and the VTR which are otherwise interconnected with a cable are simply combined into one body for appearance' sake, although it permits instant monitoring of an object's image being picked up by means of an external monitor or an electronic view finder or the like by obtaining a composite video signal such as a TV signal. According to the conventionally practiced method, the composite video signal is obtained by multiplexing a luminance signal and a carrier chrominance signal. After monitoring by using this composite signal, the luminance signal and the carrier chrominance signal are separated from the composite video signal. The luminance signal is frequency modulated. The chrominance carrier signal is low band frequency converted. After that, the two signals are frequency multiplexed for recording on a magnetic tape. This method, however, tends to deteriorate the video signal through repeated signal multiplexing and separating processes.

To solve this problem, it has recently been proposed to obtain a less deteriorated recording signal in the following manner: With the luminance signal and color difference signals formed by the camera part, the color difference signals are quadrature two-phase modulated directly to a low frequency band to obtain a low band carrier chrominance signal by using a low band carrier signal. At the same time, the luminance signal obtained from the camera part is frequency modulated. The luminance signal is then frequency multiplexed together with the low band carrier chrominance signal.

According to that method, however, the color difference signals are frequency converted directly to the low frequency band during the process of quadrature two-phase modulation. As a result of this, it is only the luminance signal that is available for monitoring the picked up image for recording. The method thus allows the operator to monitor only through a black-and-white picture even in the case of taking a color picture.

In order to make monitoring in the form of a color picture possible, it is necessary to provide the VTR with a frequency conversion circuit which is arranged to raise the low band carrier chrominance signal which is converted to a low frequency band by the above stated quadrature two-phase modulation up to the frequency band of the carrier chrominance signal included in a TV signal; and to add the luminance signal to the output of this frequency conversion circuit. While such arrangement may enable the operator to monitor the picked up or sensed image in color, it necessitates the addition of a frequency conversion circuit and an adder solely for the purpose of monitoring in color. However, such additions to the camera-combined type VTR which is strongly desired to be compact in size and weight are hardly allowable, because they would cause increases in the number of circuit elements, size of the apparatus and cost of manufacture.

SUMMARY OF THE INVENTION

It is a general object of this invention to solve the above stated problems of the prior art.

It is a more specific object of this invention to provide a video signal reproducing apparatus which, in spite of having a simple arrangement, is capable of multiplexing a reproduced video signal with a sensed image video signal obtained by picking up the image of an object and is capable of performing versatile functions.

Under this object, a video signal reproducing apparatus which is arranged as an embodiment of this invention comprises: image sensing means arranged to generate a first video signal which corresponds to information on a sensed image of an object by sensing the image; reproducing means arranged to produce a second video signal by reproducing a video signal from a record bearing medium; and video signal forming means arranged to form and produce, by using the first and second video signal, at least one picture portion of a third video signal which consists of a time sharing mixture of the first and second video signals.

It is another object of this invention to provide a video signal reproducing apparatus which is capable despite of simple arrangement thereof, of attaining a special effect called a wipe effect by varying the ratio in which a portion of a reproduced video signal and a portion of a video signal representing a sensed image of an object are multiplexed.

Under that object, a video signal reproducing apparatus which is arranged as another embodiment of this invention comprises: image sensing means arranged to generate a first video signal which corresponds to information on a sensed image of an object obtained by sensing the image; reproducing means arranged to produce a second video signal by reproducing a video signal from a recording medium; video signal forming means for forming, from the first and second video signals, a third video signal in which a portion of the first video signal and a portion of the second video signal are multiplexed in a time sharing manner; and multiplexing control means arranged to vary the ratio in which the portion of the first video signal and that of the second video signal are multiplexed by the video signal forming means.

It is a further object of this invention to provide a video signal reproducing apparatus which permits reduction in size and cost thereof through functional diversification with a portion thereof arranged to perform different functions.

Under this object, a color video signal reproducing apparatus which is arranged as an embodiment thereof to reproduce a color video signal including at least a luminance signal and a chrominance signal comprises: image sensing means arranged to generate, by sensing an image of an object, a first color video signal which corresponds to information on the sensed image of the object; recording signal forming means arranged to form a recording signal from the first color video signal for recording on a recording medium; reproducing means for reproducing, as a reproduced signal, the signal recorded on the recording medium; in the form of a reproduced signal; and a second color video signal forming means arranged to produce a second color video signal which differs from the first color video signal by selectively obtaining either said first color video signal from the image sensing means or said reproduced signal from the reproducing means and by forming the second color video signal from the signal selectively obtained.

These and other objects and features of the invention will become apparent from the following detailed description of embodiments thereof taken in connection with the accompanying drawings.

BRIEF DESCRIPTION OF THE DRAWINGS

FIG. 3(a) shows the reproduced picture plane obtained in a first multiplex reproduction mode; FIG. 3(b) the reproduced picture plane obtained in a second multiplex reproduction mode; and FIG. 3(c) the reproduced picture plane obtained in a third multiplex reproduction mode respectively.

DETAILED DESCRIPTION OF PREFERRED EMBODIMENTS

Figure 1:
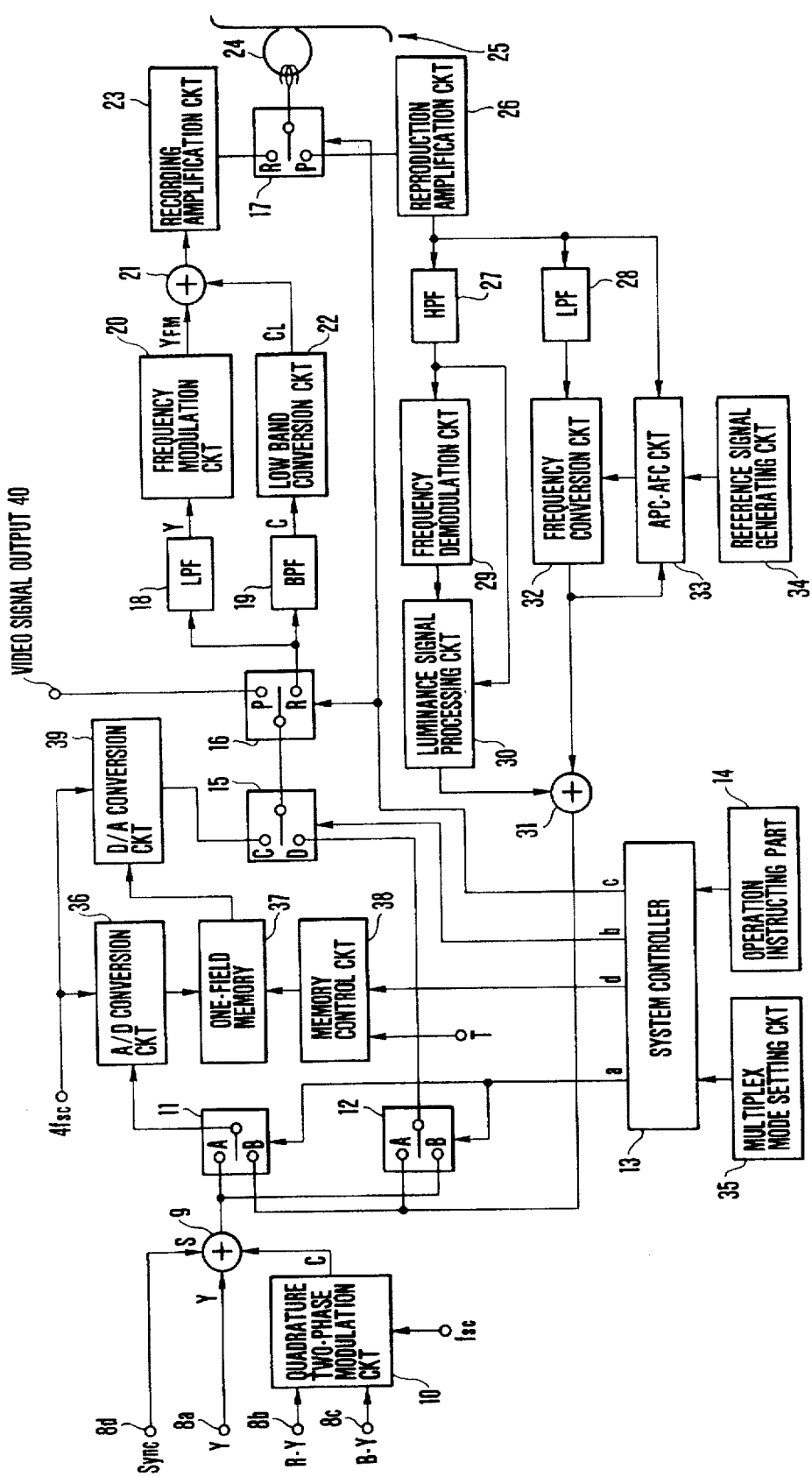
FIG. 1 is a diagram showing in outline the arrangement of the VTR part of a camera-combined type VTR to which this invention is applied as a first embodiment thereof.
Figure 2:
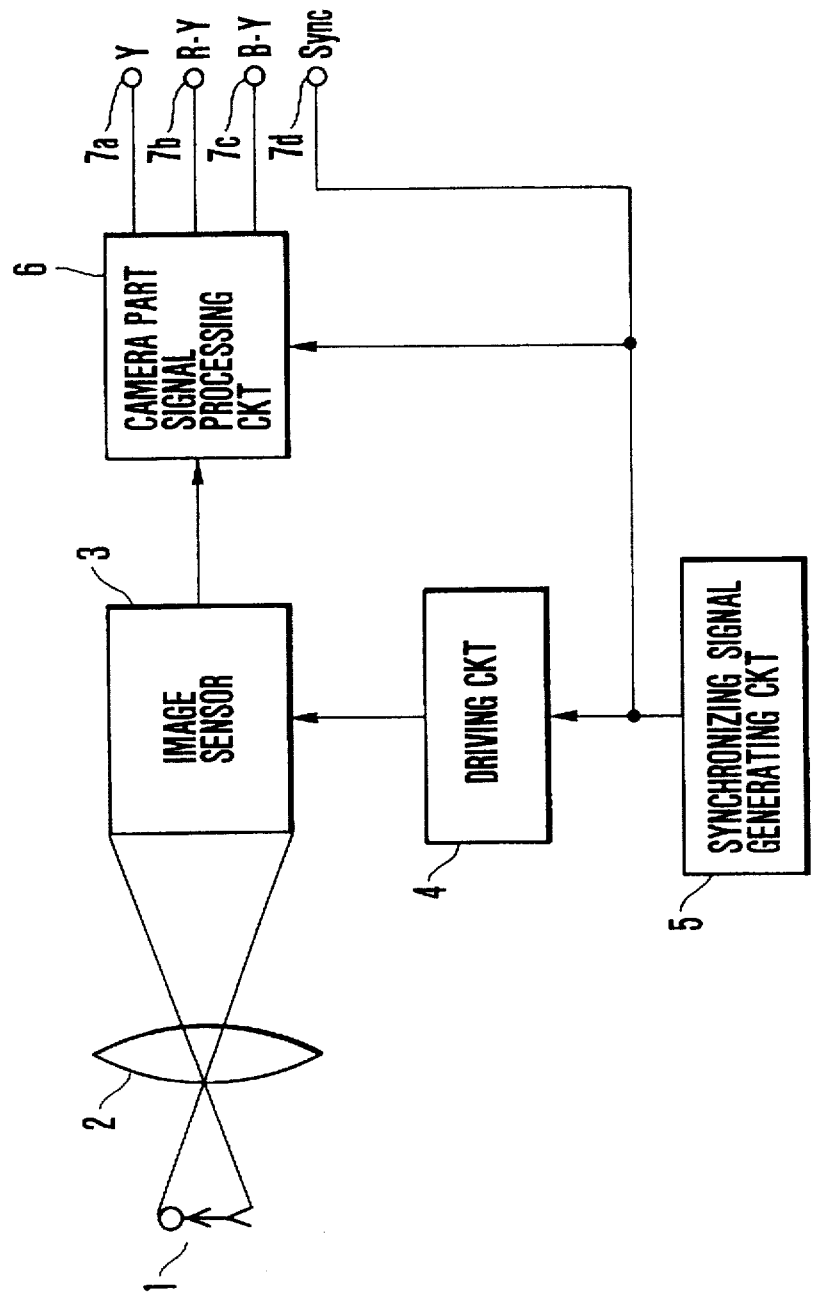
FIG. 2 is a diagram showing in outline the arrangement of the camera part of the camera-combined type VTR arranged as the first embodiment of the invention.

This invention is described in further detail below giving some embodiment examples thereof:

FIGS. 1 and 2 show in outline the arrangement of a camera-combined type VTR to which this invention is applied as a first embodiment thereof. FIG. 1 showing the VTR part and FIG. 2 the camera part of the VTR. The recording operation of the first embodiment is first described as follows:

Referring to FIG. 2, in recording, the image of an object 1 is obtained as an optical image through an image taking lens 2 and is formed on the image sensing surface of an image sensor 3 having a stripe filter which is not shown. The image sensor 3 is driven by driving pulses produced from a driving circuit 4. In response to the driving pulses, the sensor 3 produces a signal corresponding to the optical image of the object 1 formed on the image sensing surface. The signal is supplied to a camera part signal processing circuit 6. Meanwhile, horizontal and vertical synchronizing signals Sync which are generated by a synchronizing signal generating circuit 5 are supplied to the driving circuit 4. The circuit 4 generates the driving pulses in synchronism with the synchronizing signals. The camera part signal processing circuit 6 consists of a sample-and-hold circuit and a matrix circuit. The circuit 6 forms a luminance signal Y and color difference signals R-Y and B-Y, corresponding to the optical image of the object 1, from the signal produced by the image sensor 3 in synchronism with the synchronizing signal Sync supplied by the synchronizing signal generating circuit 5. These signals Y, R-Y and B-Y are supplied from output terminals 7a, 7b and 7c to the VTR part shown in FIG. 1. The synchronizing signal Sync is also supplied to the VTR part via another output terminal 7d.

The luminance signal Y and the color difference signals R-Y and B-Y which are formed at the camera part shown in FIG. 2 as mentioned above are supplied to the VTR part via input terminals 8a, 8b and 8c as shown in FIG. 1. After that, the luminance signal Y is supplied to a frequency multiplexing circuit 9. The color difference signals R-Y and B-Y are supplied to a quadrature two-phase modulation circuit 10. To the circuit 10 is supplied a carrier signal fsc from a signal generating circuit which is not shown. This carrier signal fsc is quadrature two-phase modulated with the color difference signals R-Y and B-Y to obtain a carrier chrominance signal C. This carrier chrominance signal C is supplied to the frequency multiplexing circuit 9.

To the frequency multiplexing circuit 9 are supplied the horizontal and vertical synchronizing signals Sync which are generated by the above stated synchronizing signal generating circuit 5 and come via the output terminal 7d and an input terminal 8d. The circuit 9 then frequency multiplexes the luminance signal Y, the carrier chrominance signal C and the synchronizing signal Sync to obtain a TV signal of, for example, the NTSC system. The TV signal thus obtained is supplied to one connecting side A of a change-over switch 11 and one connecting side B of another change-over switch 12. These switches 11 and 12 operate under the control of a system controller 13. When an instruction for a recording operation is given from an operation instructing part 14, the system controller 13 shifts the connecting positions of the switches 11 and 12 to their sides B by supplying a control signal to the switches 11 and 12 via an output terminal "a".

The controller 13 controls also the switching operations of change-over switches 15, 16 and 17. With the instruction for recording given from the operation instructing part 14, the controller 13 supplies a control signal via an output terminal "b" thereof to the change-over switch 15 to shift the connecting position thereof to one side D thereof and another control signal via an output terminal "c" to the change-over switches 16 and 17 to shift their connecting positions to their sides R respectively.

With the connecting positions of these switches shifted as mentioned above, the TV signal from the frequency multiplexing circuit 9 is supplied via the change-over switches 12, 15 and 16 to the low-pass filter (LPF) 18 and a band-pass filter (BPF) 19. The luminance signal Y of the TV signal is separated by the LPF 18 and the carrier chrominance signal C by the BPF 19. The luminance signal Y separated is frequency modulated by a frequency modulation circuit 20 to a high frequency band and thus becomes a frequency modulated luminance signal YFM. The signal YFM is supplied to a frequency multiplexing circuit 21. The carrier chrominance signal C separated is frequency converted to a low frequency band by a low band conversion circuit 22 and thus becomes a low band carrier chrominance signal CL. The signal CL is supplied also to the frequency multiplexing circuit 21. The circuit 21 then frequency multiplexes the frequency modulated luminance signal YFM and the low-band carrier chrominance signal CL together to obtain thereby a recording signal. The recording signal is amplified by a recording amplification circuit 23. The amplified recording signal is then recorded on a magnetic tape 25 by a magnetic head 24 via the change-over switch 17 which is on its connecting side R shown in FIG. 1.

The reproducing operation of the embodiment shown in FIG. 1 is as follows: Referring to FIG. 1, when an instruction for a reproducing operation is given from the operation instructing part 14, the system controller 13 produces a control signal from its output terminal c to control the change-over switches 16 and 17 for a reproducing operation. The connecting positions of the switches 16 and 17 are shifted to their sides P.

Then, during reproduction, a tracking control circuit which is not shown controls a magnetic head 24 to cause it to trace recording tracks formed on a magnetic tape 25. A reproduced signal obtained from the magnetic head 24 is supplied to a reproduction amplification circuit 26 via the change-over switch 17 which is on one connecting side P thereof. An amplified reproduced signal thus obtained is supplied to a high-pass filter (HPF) 27 and an LPF 28. The HPF 27 then separate from the reproduced signal a frequency modulated luminance signal YFM which has been frequency modulated to a high frequency band. The LPF 28 separates from the reproduced signal a low-band carrier chrominance signal CL which has been frequency modulated to a low frequency band. The frequency modulated luminance signal YFM which is thus separated is supplied to a frequency demodulation circuit 29. The circuit 29 demodulates it into a luminance signal Y, which is then supplied to a luminance signal processing circuit 30. The luminance signal processing circuit 30 receives the frequency demodulated luminance signal Y and the frequency modulated luminance signal YFM and includes a drop-out compensation circuit which is arranged to detect occurrence of any drop-out by monitoring the frequency modulated luminance signal YFM and to make compensation for the drop-out of the luminance signal Y. The circuit 30 also includes an edge emphasizing circuit which is arranged to emphasize the edge component of the luminance signal. After completion of such luminance signal processing actions of these circuits, the luminance signal Y is supplied to a frequency multiplexing circuit 31.

Meanwhile, the low-band carrier chrominance signal CL which is separated is supplied to a frequency conversion circuit 32. Then, a known AFC-APC circuit 33 frequency converts the low-band carrier chrominance signal CL into a carrier chrominance signal C by using a reference signal which includes a jitter component which arises during reproduction. Then, after removal of the jitter component arising during reproduction, the carrier chrominance signal is supplied to the frequency multiplexing circuit 31. Further, the AFC-APC circuit 33 receives the reference signal which is generated by a reference signal generating circuit 34, the carrier chrominance signal C frequency converted by the frequency conversion circuit 32 and the reproduced signal. The circuit 33 separates a burst signal from the carrier chrominance signal C and the horizontal synchronizing signal from the reproduced signal; and, by using these signals, forms in a known manner the reference signal which includes the jitter component.

The reproduced luminance signal Y and the reproduced carrier chrominance signal C are frequency multiplexed by the frequency multiplexing circuit 31. The output of the circuit 31 is then supplied to the connecting side B of the change-over switch 11 and the side A of the change-over switch 12 as a reproduced video signal.

In case that a multiplex reproducing mode is not designated at a multiplex mode setting circuit 35 which will be described later and a reproducing operation is designated alone at the operation instructing part 14, the camera part which is shown in FIG. 2 does not operate. Further, in that case, a control signal is produced from the output terminal "a" of the system controller 13 for shifting the connecting position of the change-over switch 11 to its side B and that of the change-over switch 12 to its side A. With the positions of these switches 11 and 12 thus shifted, the reproduced video signal is then supplied via the switch 12 to the A/D conversion circuit 36 and also to the connecting side D of another change-over switch 15 via the switch 12. Meanwhile, to the A/D conversion circuit 36 is supplied a signal 4 fsc which is produced from a signal generating circuit (not shown) and is of a frequency four times as high as that of a carrier signal fsc. The circuit 36 uses this signal 4fsc as a sampling frequency and converts the reproduced video signal into a digital video signal having eight bits per sample. This digital video signal is written into a one-field memory 37 for every field period.

Writing and reading into and from the one-field memory 37 are performed under the control of a memory control circuit 38. The memory control circuit 38 is arranged to monitor a tracking state signal T coming from a tracking control circuit which is not shown. In the case of an adequate tracking state during reproduction, one field portion of the digital video signal which is supplied to the one-field memory 37 is allowed to be written into the memory 37. Further, the memory control circuit 38 causes the digital video signal stored at the one-field memory 37 to be read out in synchronism with the reproduced video signal produced from the frequency multiplexing circuit 31 according to a reading control signal produced from the output terminal "d" of the system controller 13. The digital video signal which is thus read out is converted into an analog video signal by D/A conversion circuit 39. The analog video signal is then supplied to the connecting side C of the change-over switch 15.

The change-over switch 15 operates under the control of the system controller 13. More specifically, the controller 13 produces a control signal from its output terminal "b" for shifting the connecting position of the switch 15 to its side D when an instruction for ordinary reproduction is given from the operation instructing part 14. Then, the reproduced video signal produced from the frequency multiplexing circuit 31 is allowed to be produced as it is from an output terminal 40 via the change-over switch 15 and another change-over switch 16 which has its connecting position on one side P thereof.

When an instruction for a special reproducing operation, such as still picture reproduction or slow motion reproduction, is given from the operation instructing part 14, the system controller 13 produces a control signal from its output terminal "b" to shift the connecting position of the change-over switch 15 to its side C. While the connecting position of the switch 15 is thus shifted to its side C, the tracking control circuit which is not shown causes the magnetic tape 25 to travel, to come to a stop or to travel at a slower speed than an ordinary reproducing speed. The reproduced video signal produced from the frequency multiplexing circuit 31 is written into the one-field memory 37 once and, after that, is read out via the change-over switches 15 and 16 from the output terminal 40. Further, in the event of such a special reproducing operation, the memory control circuit 38 operates to have only a reproduced video signal portion that is obtained under an adequate tracking condition allowed to be written into the one-field memory 37. Therefore, the reproduced video signal which is produced from the output terminal 40 during the special reproduction always gives an adequate still or slow motion picture without any noise nor any blur.

Figure 3:
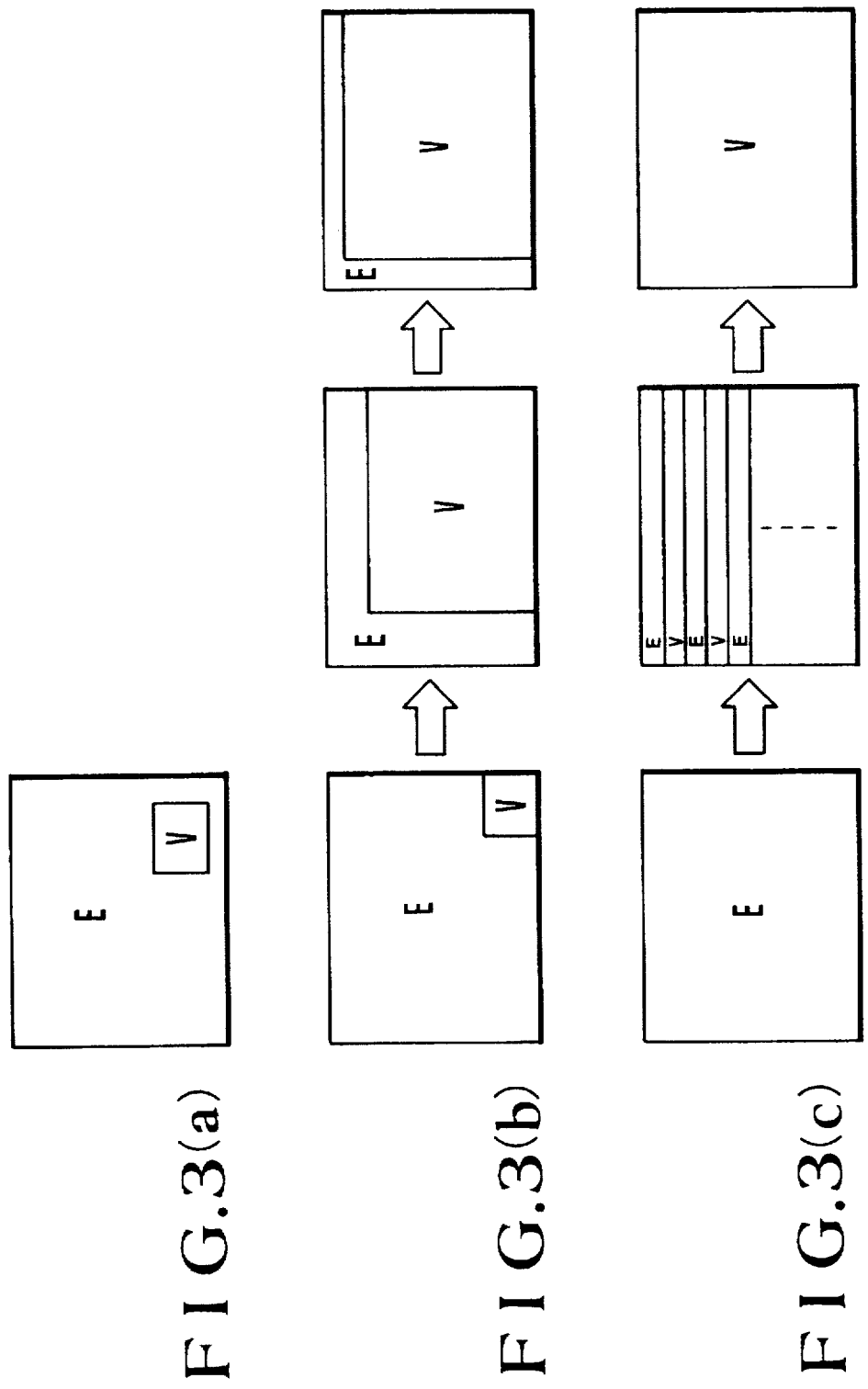
FIGS. 3(a), 3(b) and 3(c) show reproduced picture planes obtained by the camera-combined type VTR of the first embodiment shown in FIGS. 1 and 2 when the VTR is in the multiplex reproduction mode thereof. Of these figures.

The multiplex reproduction mode of this embodiment is as follows: Referring to FIGS. 3(a) to 3(c), the camera-combined type VTR of this embodiment has three different multiplex reproduction modes. Let us assume that, on the picture plane of a TV monitor, a sensed image picture obtained from the camera part is E and a reproduced picture obtained from the VTR part is V. FIG. 3(a) shows a first multiplex reproduction mode, or the so-called picture-in-picture mode, in which: The reproduced picture V obtained from the VTR part is superimposed in a reduced size in a given position on the sensed image picture E obtained by the camera part. FIG. 3(b) shows a second multiplex reproduction mode, in which: The reproduced picture V is at first superimposed on the sensed image picture E in a reduced shape like in the case of the first mode; after that the reproduced picture V is gradually enlarged; and eventually the whole picture plane is covered by the reproduced picture V. FIG. 3(c) shows a third multiplex reproduction mode, in which: The whole picture plane is first occupied by the sensed image picture E. After that, the picture E and the reproduced picture V are alternately displayed by and by at intervals of a given number of horizontal lines, for example, from the upper part of the picture plane. Then, the whole picture plane is eventually occupied by the reproduced picture V. Further, in these different multiplex reproduction modes, the interrelation of the sensed image picture E and the reproduced picture V may be reversed. In other words, a sensed image picture E which is reduced in size may be inserted in a reproduced picture V or the display of the reproduced picture V may be arranged to be changed over to that of the sensed image picture E. However, the following description will be made on the assumption that the multiplex reproduction modes are arranged to be as shown in FIGS. 3(a), 3(b) and 3(c):

In performing a multiplex reproducing operation with the camera-combined type VTR of this embodiment, one of the three multiplex reproduction modes described above is selected by operating an operation part which is not shown but is provided at the multiplex mode setting circuit 35. With any of the first, second and third modes thus selected at the multiplex mode setting circuit 35, the camera part which is shown in FIG. 2 becomes operative.

When the first multiplex reproduction mode is selected, the multiplex mode setting circuit 35 produces and supplies a multiplex reproduction mode designation signal for the first multiplex reproduction mode to the system controller 13. In response to this signal, the system controller 13 applies a control signal via its output terminal "a" to the change-over switches 11 and 12. The control signal causes these switches to change their connecting positions to their sides B. This allows a reproduced video signal produced from the frequency multiplexing circuit 31 to be supplied via the switch 11 to the A/D conversion circuit 36. On the other hand, a TV signal generated at the camera part is supplied as a sensed image video signal to one connecting side D of the change-over switch 15 via the change-over switch 12.

The reproduced video signal which is supplied to the A/D conversion circuit 36 is digitized like in the case of ordinary reproduction and is written into the one-field memory 37. Meanwhile, the control signal which is produced from the output terminal "b" of the system controller 13 for the first multiplex reproduction mode is supplied to the change-over switch 15. This signal causes the connecting position of the switch 15 to be on the side C thereof only for a period during which a portion of the video signal corresponding to the reduced size picture is inserted. With the exception of the inserting period, the connecting position of the switch 15 is on the side D.

In this instance, a reading control signal for the first multiplex reproduction mode is produced from the output terminal "d" of the system controller 13 and is supplied to the memory control circuit 38. The circuit 38 intermittently generates a reading address for the one-field memory 37. The digital video signal written at the one-field memory 37 is read out and is converted into an analog video signal by the D/A conversion circuit 39. The analog video signal is then supplied to the connecting side C of the change-over switch 15. Then, as mentioned above, the reproduced video signal portion corresponding to the reduced size picture is inserted into the sensed image video signal by the switching action of the change-over switch 15. The video signal thus obtained is then produced via the change-over switch 16 from the output terminal 40.

When the second multiplex reproduction mode is selected, the multiplex mode setting circuit 35 supplies the system controller 13 with a multiplex reproduction mode designating signal for the second mode. Then, like in the case of the first multiplex reproduction mode, the system controller 13 produces a control signal from its output terminal "a". The control signal shifts the connecting positions of the change-over switches 11 and 12 to their sides B. A reproduced video signal produced from the frequency multiplexing circuit 31 is then supplied via the switch 11 to the A/D conversion circuit 36. The TV signal generated by the camera part is supplied as a sensed image video signal to the connecting side D of the change-over switch 12 via the change-over switch 12.

The reproduced video signal supplied to the A/D conversion circuit 36 is digitized and is written into the one-field memory 37 like in ordinary reproduction. A control signal for the second multiplex reproduction mode is produced from the output terminal "b" of the system controller 13 and is supplied to the change-over switch 15. Within one field period, the connecting position of the switch 15 is on the side C thereof only for a period during which the video signal portion corresponding to the picture is to be inserted. During the rest of one field period, the connecting position of the switch 15 is on the side D thereof. Further, in the case of the second multiplex reproduction mode, the inserted picture is gradually enlarged every time a predetermined period of time lapses. The connecting position of the change-over switch 15 eventually comes to stay on the side C thereof for the whole one-field period to allow the video signal portion corresponding to the inserted picture to be kept produced during the whole period.

Further, in this instance, a reading control signal for the second multiplex reproduction mode is produced from the output terminal "d" of the controller 13 and is supplied to the memory control circuit 38. The memory control circuit 38 then generates a reading address for the one-field memory 37 to have the digital video signal portion which corresponds to the inserting picture produced for every predetermined period. The digital video signal thus read out from the one-field memory 37 is converted into an analog video signal by the D/A conversion circuit 39. The analog video signal thus obtained is supplied to the connecting side C of the change-over switch 15. Then, as mentioned in the foregoing, the switch 15 operates in such a manner that the reproduced video signal portion corresponding to the inserting picture which enlarges at the lapse of every predetermined period is inserted into the sensed image video signal. Then, the video signal is produced via the change-over switch 16 from the output terminal 40.

In the event of selection of the third multiplex reproduction mode, the multiplex mode setting circuit 35 applies a mode designation signal for the third mode to the system controller 13. Then, the system controller 13, like in the case of the first multiplex reproduction mode, produces a control signal from its output terminal "a". The control signal is applied to the change-over switches 11 and 12 to shift their connecting positions to their sides B. The reproduced video signal is allowed to be supplied via the switch 11 to the A/D conversion circuit 36. Meanwhile, the TV signal generated at the camera part is allowed to be supplied as a sensed image video signal via the switch 12 to the connecting side D of the change-over switch 15.

The reproduced video signal which is supplied to the A/D conversion circuit 36 is digitized, in the same manner as in ordinary reproduction, and is written into the one-field memory 37. Meanwhile, a control signal for the third multiplex reproduction mode is supplied from the output terminal "b" of the system controller 13 to the change-over switch 15. Under the control of this signal, the connecting position of the switch 15 is on the side C thereof only for a period during which the video signal portion corresponding to the picture to be inserted is inserted within one field period. During the rest of the time within the one-field period, the connecting position of the switch 15 is on the side D thereof. Further, in the case of the third multiplex reproduction mode, the above stated inserting picture is inserted in such a way as to have equal portions thereof each consisting of a predetermined number of lines are inserted, one by one, at intervals of a predetermined period of time until the connecting position of the change-over switch 15 comes to stay on the side C thereof for the whole one-field period, the switch 15 thus being controlled to eventually allow the video signal portion corresponding to the inserting picture to be continuously produced.

Meanwhile, a reading control signal for the third multiplex reproduction mode is produced from the output terminal "d" of the system controller 13 and is supplied to the memory control circuit 38. In response to this signal, the memory control circuit 38 generates reading addresses for the one-field memory 37 in such a way as to cause a portion of the digital video signal which corresponds to the lines to be inserted during each of the predetermined periods to be read out from the memory 37 at intervals of the predetermined period. The read-out digital video signal is converted into an analog video signal by the D/A conversion circuit 39. The analog video signal is supplied to the connecting side C of the change-over switch 15. Then, as mentioned above, the switch 15 operates to have the portion of the reproduced video signal corresponding to the inserting lines which gradually increase for every predetermined period of time inserted into the sensed image video signal. Then, the video signal is produced via the change-over switch 16 from the output terminal 40.

The camera-combined type VTR described above is thus arranged to be capable of simply imparting a special effect to the reproduced video signal by operating the camera part during a reproducing operation of the VTR part and by multiplexing the sensed image video signal formed by the camera part and the reproduced video signal obtained by the VTR in a time sharing manner.

Further, operation of the first embodiment in the first multiplex reproduction mode may be changed to insert the sensed image picture in a reduced size into the reproduced picture or to change the reproduced picture over to the sensed image picture as mentioned above. In the event of this modification, when the multiplex reproduction mode designation signal is produced from the multiplex mode setting circuit 35, the system controller 13 is arranged to produce a control signal from its output terminal "a" for shifting the connecting positions of the change-over switches 11 and 12 to their sides A instead of shifting them to their connecting sides B.

While the first embodiment has been described by way of example to have the multiplex reproduction modes as shown in FIGS. 3(a), 3(b) and 3(c), the kinds of such modes possible with the camera-combined type VTR according to this invention are of course not limited to these modes.

Figure 4:
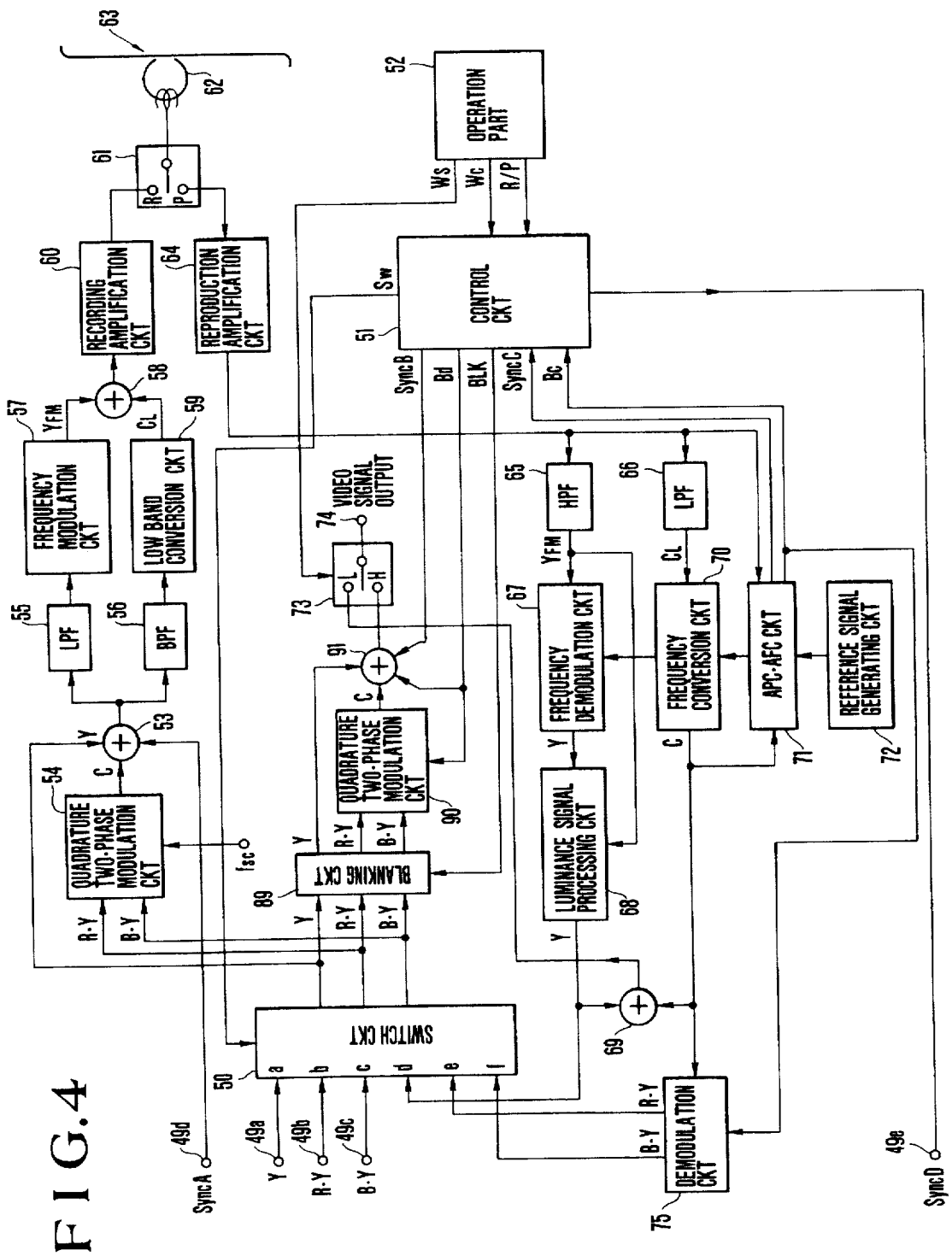
FIG. 4 is a diagram showing in outline the arrangement of the VTR part of a camera-combined type VTR to which this invention is applied as a second embodiment thereof.
Figure 5:
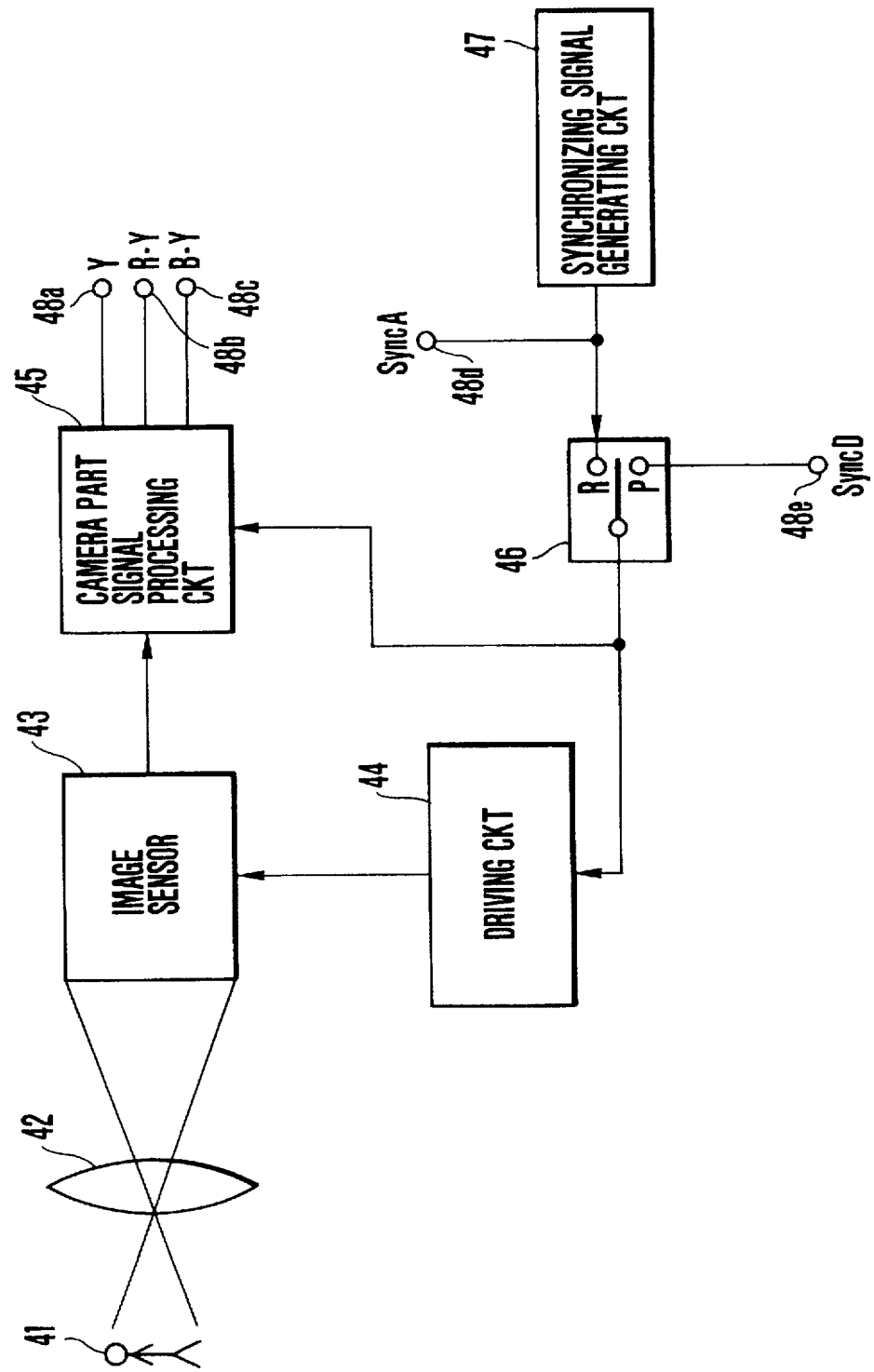
FIG. 5 is a diagram showing in outline the arrangement of the camera part of the second embodiment.

FIGS. 4 and 5 show in outline the arrangement of a camera-combined type VTR to which this invention is applied as a second embodiment thereof. FIG. 4 showing the VTR part and FIG. 5 the camera part of the embodiment.

The recording operation of the second embodiment is as follows: Referring to FIG. 5, the image of an object 41 is formed as an optical image via an image pickup lens 42 on the image sensing surface of an image sensor 43 having a stripe filter which is not shown. The image sensor 43 is driven by driving pulses produced from a driving circuit 44 and is arranged to supply a camera part signal processing circuit 45 with a signal which corresponds to the optical image of the object 41 formed on the image sensing surface. The driving circuit 44 is arranged to receive horizontal and vertical synchronizing signals SyncA which is produced from a synchronizing signal generating circuit 47 via a change-over switch 46. The connecting position of the switch 46 is on one connecting side R thereof during a recording operation. The driving pulses are generated by the circuit 44 in synchronism with the synchronizing signals SyncA.

The camera part signal processing circuit 45 is composed of a sample-and-hold circuit and a matrix circuit. The circuit 45 is arranged to receive the synchronizing signals SyncA from the circuit 47 and to form, from the signal produced from the image sensor 43, a luminance signal Y and color difference signals R-Y and B-Y corresponding to the optical image of the object 41 in synchronism with the synchronizing signals SyncA. The signals Y, R-Y and B-Y are supplied via output terminals 48a, 48b and 48c to the VTR part which is shown in FIG. 4. Further, the synchronizing signals SyncA produced from the synchronizing signal generating circuit 47 are supplied also to the VTR part via another output terminal 48d of the camera part.

Referring to FIG. 4, the luminance signal Y and the color difference signals R-Y and B-Y which are formed by the camera part shown in FIG. 5 are received by the VTR part through its input terminals 49a, 49b and 49c. These signals are supplied to a switch circuit 50. The switch circuit 50 is arranged to allow these signals coming from its terminals "a", "b" and "c" to be produced therefrom when a switch control signal Sw which is produced from a control circuit 51 is at a low level and to allow signals coming from its other terminals "d", "e" and "f" to be produced therefrom when the switch control signal Sw is at a high level.

Figure 6:
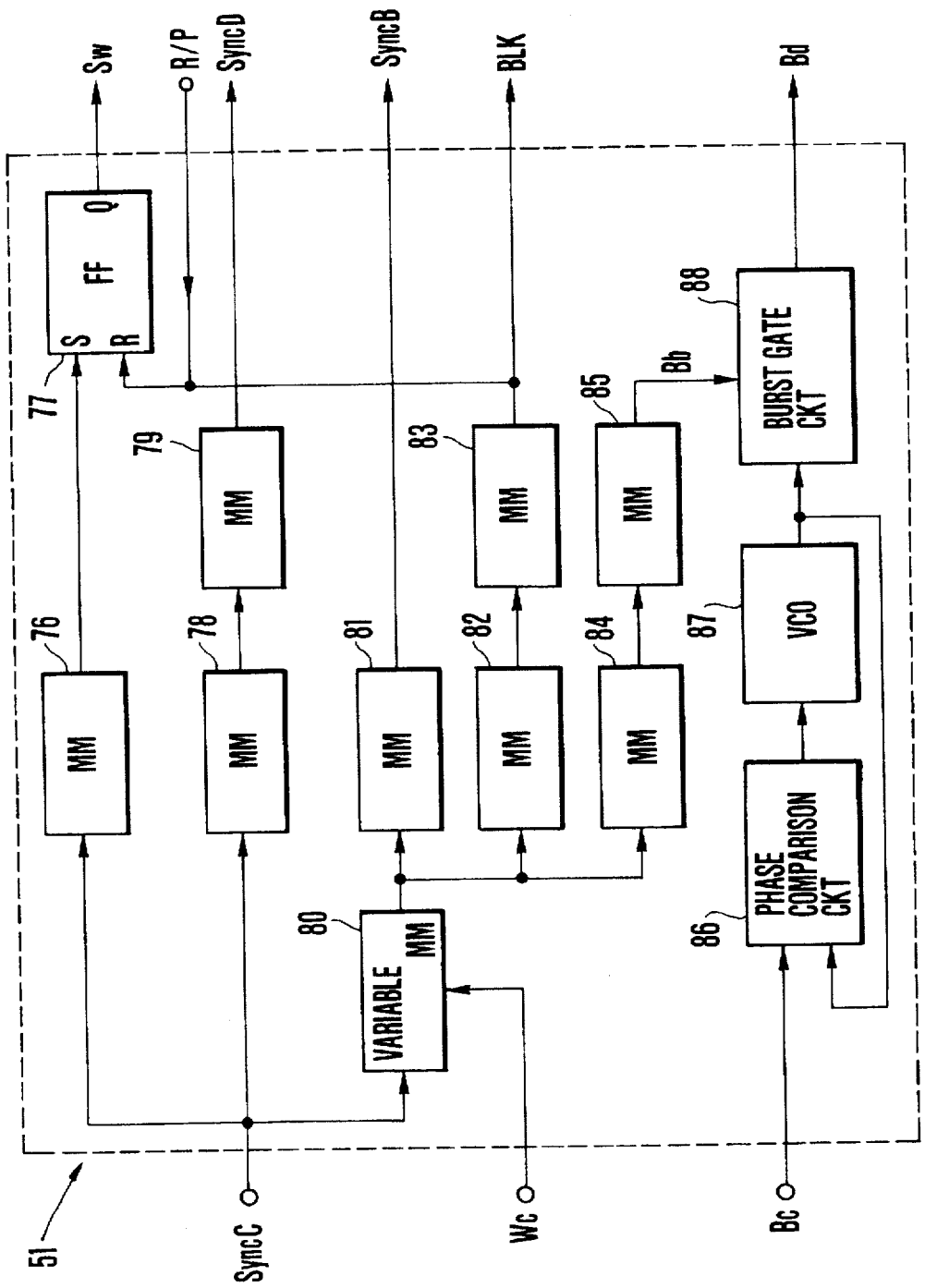
FIG. 6 is a diagram showing the details of a control circuit included in the embodiment shown in FIG. 1.

Referring to FIG. 4, an operation part 52 is arranged to supply a control circuit 51 with an operation instructing signal R/P at a high level for a recording operation and at a low level for a reproducing operation. Therefore, in the case of recording, the operation instructing signal R/P is supplied at a high level to the control circuit 51. The details of the control circuit 51 are as shown in FIG. 6. This high level signal R/P is received at the reset terminal R of a flip-flop (FF) circuit 77 as shown in FIG. 6. As a result of this, the FF circuit 77 supplies the above stated switch circuit 50 with a switch control signal Sw at a low level. This causes the switch circuit 50 to produce therefrom the signals received at the input terminals "a", "b" and "c" thereof.

Of the signals produced from the switch circuit 50, the luminance signal Y is supplied to a frequency multiplexing circuit 53 and the color difference signals R-Y and B-Y to a quadrature two-phase modulation circuit 54. Meanwhile, the circuit 54 is provided with a carrier signal fsc from a signal generating circuit which is not shown. The circuit 54 forms a carrier chrominance signal C by quadrature two-phase modulating this carrier signal with the color difference signals R-Y and B-Y. The carrier chrominance signal C is supplied to the above stated frequency multiplexing circuit 53.

In addition to the above stated signals Y and C, the frequency multiplexing circuit 53 also receives a synchronizing signal SyncA which is produced from the synchronizing signal generating circuit 47 of the camera part shown in FIG. 5 and comes via the output terminal 48d and an input terminal 49d shown in FIG. 4. The circuit 53 forms a TV signal of the NTSC color system by frequency multiplexing the luminance signal Y, the carrier chrominance signal C and the synchronizing signal SyncA. The TV signal is supplied to a low-pass filter (LPF) 55 and a band-pass filter (BPF) 56. The luminance signal Y is separated by the LPF 55 and the carrier chrominance signal C by the BPF 56. The luminance signal Y separated is frequency modulated into a frequency modulated luminance signal YFM of a higher frequency band by a frequency modulation circuit 57. The frequency modulated luminance signal is supplied to a frequency multiplexing circuit 58. The separated carrier chrominance signal C is frequency converted into a low-band carrier chrominance signal CL of a lower frequency band by a low band conversion circuit 59. The signal CL is supplied to the frequency multiplexing circuit 58. The circuit 58 forms a recording signal by frequency multiplexing the frequency modulated luminance signal YFM and the low-band carrier chrominance signal CL. The recording signal is amplified by a recording amplification circuit 60 and is supplied to a change-over switch 61 which is on one connecting side R during a recording operation. The switch 61 thus allows the recording signal to be recorded by a magnetic head 62 on a magnetic tape 63.

The reproducing operation of the second embodiment shown in FIG. 4 is as follows: When the operation part 52 is operated to designate a reproducing operation, the part 52 supplies the control circuit 51 with the operation instructing signal R/P at a low level. As a result of this, the FF circuit 77 of FIG. 6 is released from a reset state. A tracking control circuit which is not shown then controls and causes the magnetic head 62 to trace recording tracks formed on the magnetic tape 63. Then, the head 62 reproduces a signal recorded in the tracks including the frequency modulated luminance signal YFM and the low-band carrier chrominance signal CL which has been converted into a low frequency band as mentioned in the foregoing. The reproduced signal obtained by the head 62 is supplied to a reproduction amplification circuit 64 via the change-over switch 61 which is on the connecting side P thereof in the case of reproduction. After amplification by the circuit 64, the reproduced signal is processed to have the frequency modulated luminance signal YFM separated by a high-pass filter (HPF) 65 and the low-band carrier chrominance signal CL separated by an LPF 66.

The frequency modulated signal YFM which is separated from the reproduced signal is supplied to a frequency demodulation circuit 67 to be frequency demodulated back to the luminance signal Y. The luminance signal Y is supplied to a luminance signal processing circuit 68. The circuit 68 includes among others a drop-out compensation circuit which monitors the frequency demodulated luminance signal Y and the frequency modulated luminance signal YFM to detect whether or not any drop-out has occurred and compensates for any drop-out of the luminance signal Y; and an edge emphasizing circuit. The luminance signal is processed by these component circuit elements of the circuit 68. The processed luminance signal Y is supplied to a frequency multiplexing circuit 69.

The low-band carrier chrominance signal CL which is also separated is supplied to a frequency conversion circuit 70. Then, the circuit 70 frequency converts the signal CL back to the carrier chrominance signal C and also removes any jitter component that arises during reproduction by using a reference signal which includes the jitter component generated by a known APC-AFC circuit 71 during reproduction. The carrier chrominance signal is then supplied to the frequency multiplexing circuit 69.

To the above stated AFC-APC circuit 71 are supplied a reference signal which is generated by a reference signal generating circuit 72; the carrier chrominance signal C which has been frequency converted by the frequency conversion circuit 70; and the reproduced signal. The circuit 71 then separates a burst signal from the carrier chrominance signal C and a horizontal synchronizing signal from the reproduced signal and forms the reference signal which includes the jitter component by using these signals in a well known manner.

At the frequency multiplexing circuit 69, the reproduced luminance signal Y and the reproduced carrier chrominance signal C are frequency multiplexed into a reproduced video signal, which is supplied to one connecting side L of a change-over switch 73. The switch 73 is arranged to perform a switching action under the control of a wipe action start signal Ws which is produced from the operation part 52. The connecting position of the switch 73 is shifted to the side L when the wipe action start signal Ws is at a low level and to another side H when the signal Ws is at a high level. This wipe action start signal Ws is produced from the operation part 52 at a high level when it is decided by an operation on the operation part to perform a wipe action by using an image obtained from the camera part and at a low level when it is decided not to perform the wipe action. Therefore, the connecting position of the change-over switch 73 is on its side L when the wipe action is not to be performed as the signal Ws supplied to the switch 73 is then at a low level. Under this condition, the reproduced video signal which is supplied to the side L of the switch 73 is allowed to be produced from the output terminal 74.

Figure 7:
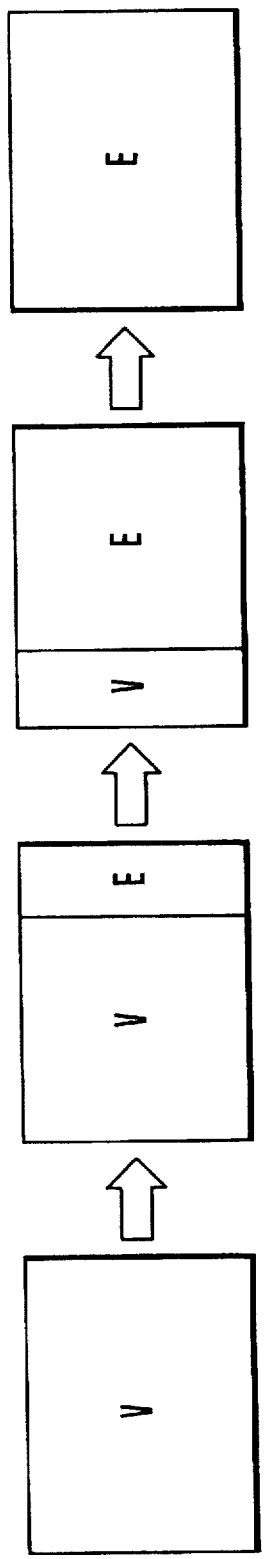
FIG. 7 is an illustration of a picture plane on a TV monitor showing an effect obtainable by the wipe action of the second embodiment.

The camera-combined type VTR embodying this invention as the second embodiment thereof is arranged to perform the above stated wipe action in a manner as described below with reference to FIG. 7:

FIG. 7 is an illustration of a picture plane on a TV monitor showing an effect attainable by the wipe action of the second embodiment. Assuming that a sensed image picture obtained from the camera part is E and a reproduced picture obtained from the VTR part is V, the picture plane is first covered entirely with the picture V. The picture V is then gradually wiped away with the picture E until it is completely replaced with the sensed image picture E. The direction in which the wipe action is to be performed is reversible. The wipe action of the second embodiment to be carried out in the case of a reproducing operation is as described below:

Referring to FIG. 4, when the wipe action is selected by means of the operation part 52 after selection of a reproducing operation, the part 52 supplies a high level wipe action start signal Ws to a change-over switch 73. Then, the connecting position of the switch 73 shifts to one side H thereof. A reproduced signal obtained from the magnetic tape 63 by the magnetic head 62 is subjected to the signal processing operation mentioned in the foregoing. As a result, a reproduced luminance signal Y is produced from the luminance signal processing circuit 68 and a reproduced carrier chrominance signal C from the frequency conversion circuit 70. The reproduced luminance signal Y is supplied to the input terminal "d" of the switch circuit 50. The reproduced carrier chrominance signal C is supplied to a demodulation circuit 75.

Meanwhile, during reproduction, a synchronizing signal SyncC and a burst signal Bc are produced from the above stated AFC-APC circuit 71. The signal SyncC is supplied to the control circuit 51 and the burst signal Bc to the demodulation circuit 75 as well as to the control circuit 51. At the demodulation circuit 75, the reproduced carrier chrominance signal C is demodulated into color difference signals R-Y and B-Y by using the burst signal Bc. The signal R-Y is supplied to the input terminal "e" of the switch circuit 50 and the signal B-Y to the input terminal "f" thereof.

At the control circuit 51, various signals required for the wipe action are formed by using the synchronizing signal SyncC and the burst signal Bc which are received from the AFC-APC circuit 71. FIGS. 8(a) to 8(j) show, in a timing chart, these various signals.

Referring to FIGS. 8(a) to 8(j), the control circuit, in this instance, operates as described below:

The synchronizing signal SyncC which is as shown in FIG. 8(c) is supplied to monostable multivibrators (hereinafter referred to as MMs) 76 and 78 and also to a variable MM 80 the delay time of which is arranged to be adjustable by changing the time constant thereof. Upon receipt of the signal SyncC, the MM 78 detects a fall trigger of the signal SyncC and delays the fall trigger for a period of time T1. Further, the MM 79 detects the fall trigger coming from the MM 78 and produces a rise trigger after the lapse of a period of time T2. A synchronizing signal SyncD is thus obtained as shown in FIG. 8(d). The signal SyncD is supplied to the side P of the change-over switch 46 of the camera part shown in FIG. 5. Since the connecting position of the switch 46 is on the side P in the case of reproduction, the image sensor 43 is driven in synchronism with the signal SyncD. The camera part signal processing circuit 45, therefore, produces a sensed image video signal in synchronism with the signal SyncD as shown in FIG. 8(b). The sensed image video signal is supplied to the input terminals "a", "b" and "c" of the switch circuit 50 of FIG. 4. Meanwhile, the reproduced video signal which is as shown in FIG. 8(a) is supplied to other input terminals "d", "e" and "f" of the switch circuit 50.

In this instance, the luminance signals Y and the color difference signals R-Y and B-Y are supplied in a state of component signals in parallel to each other from the camera part or from the reproduction system of the VTR part to the above stated input terminals of the switch circuit 50. In FIGS. 8(a) and 8(b), however, the reproduced video signal and the sensed image video signal are shown, for the sake of simplified illustration, in the forms of composite signals respectively.

Figure 8:
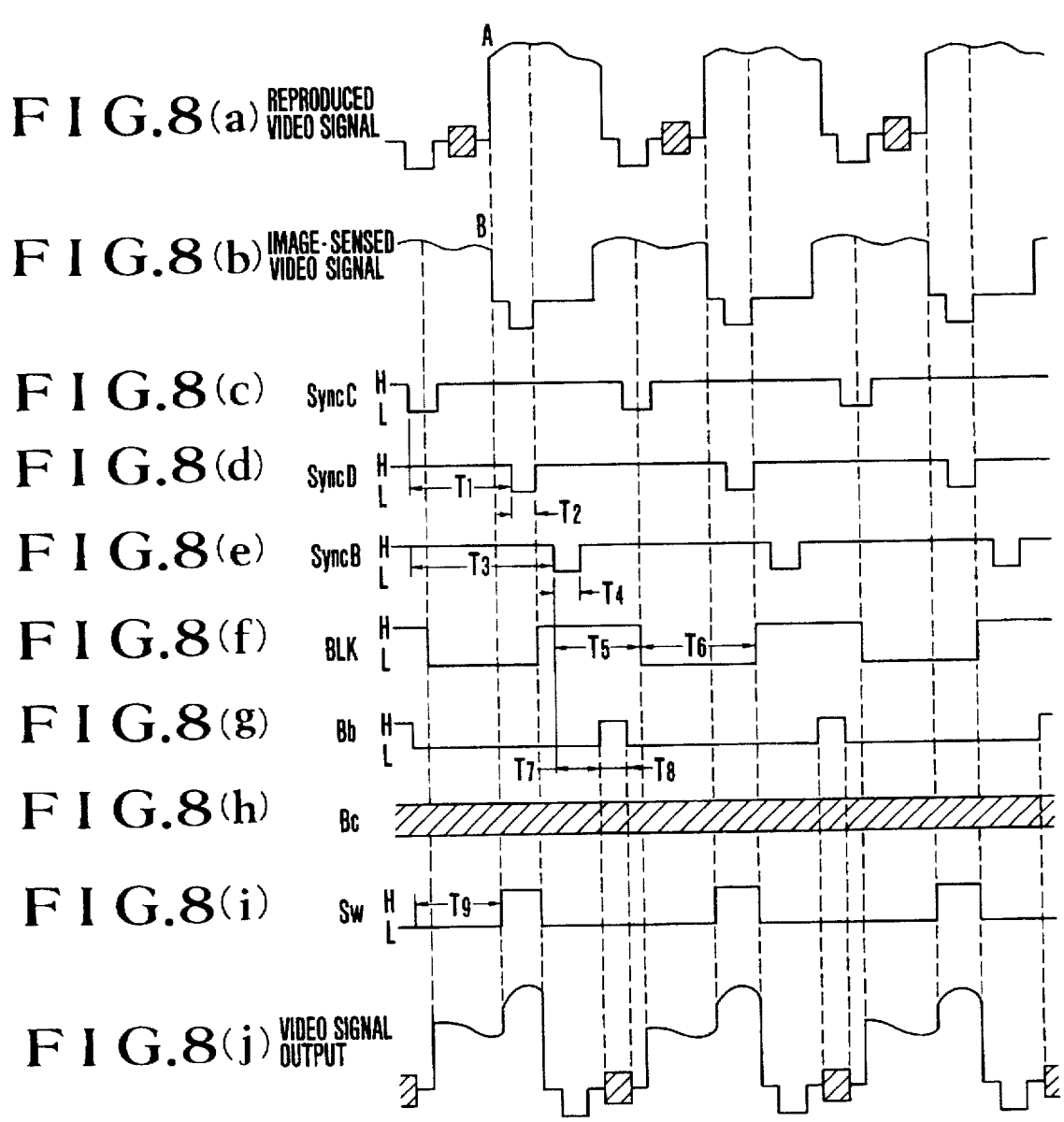
FIGS. 8(a) to 8(j) show in a timing chart various signals produced from the control circuit of FIG. 6.

The time constant of the MM 78 is determined to have the period of time T1 set at such a value that ensures the coincidence of the rise of the image signal part of the reproduced video signal (indicated by a symbol A in the drawing) and the fall of the image signal part of the sensed image video signal (B). The time T2 set by the MM 79 is arranged to coincides with the pulse width of the synchronizing signal included in the sensed image video signal. The variable MM 80 is arranged to have its time constant setting value variable in accordance with a wipe control signal Wc which is produced from the operation part 52 and corresponds to the setting value of a volume (not shown) arranged to be operable at the operation part 52. Therefore, the delay time of the MM 80 is adjustable. The variable MM 80 receives the above stated synchronizing signal SyncC and is arranged to detect the fall trigger of the signal SyncC and to delay the fall trigger signal by a period of time T3. Further, the time T3 is variable with the wipe control signal Wc coming from the operation part. The fall trigger signal which is thus delayed by the variable MM 80 is supplied to other MMs 81, 82 and 84. The MM 81 is arranged to detect the fall trigger supplied from the variable MM 80 and to produce a rise trigger signal after the lapse of a period of time T4. The MM 81 produces a synchronizing signal syncB which is as shown in FIG. 8(*e*). This signal SyncB is used as the synchronizing signal of the video signal to be produced after undergoing the wipe action and is supplied to the frequency multiplexing circuit 91 of FIG. 4. The period of time T4 set for the MM 81 coincides with the pulse width of the synchronizing signal included in the reproduced video signal. The MM 82 is arranged to detect the fall trigger signal coming from the variable MM 80 and to delay the fall trigger signal by a period of time T5. The MM 83 is arranged to detect the fall trigger signal coming from the MM 82 and to produce a rise trigger signal after the lapse of a period of time T6. By this, a blanking pulse signal BLK is obtained as shown in FIG. 8(*f*). The signal BLK is supplied to the blanking circuit 89 which is shown in FIG. 4. The circuit 89 is arranged to provide input signals with blanking periods by means of the blanking pulse signal BLK. The circuit 89 gates each input signal to give the blanking period as long as the blanking pulse signal BLK is at a high level and allows the input signal to be produced as it is while the signal BLK is at a low level.

Further, the delay time T5 set at the MM 82 corresponds to the blanking period of the reproduced video signal while the delay time T6 of the MM 83 corresponds to the image signal period of the reproduced video signal.

The MM 84 is arranged to detect the fall trigger signal coming from the variable MM 80 and to produce a rise trigger signal after the lapse of a period of time T7. The MM 85 is arranged to detect the rise trigger signal coming from the MM 84 and to produce a fall trigger signal after the lapse of a period of time T8. As a result of this, a burst gate pulse signal Bb is formed as shown in FIG. 6. The burst gate pulse signal Bb is supplied to a burst gate circuit 88 which is shown in FIG. 6. Referring to FIG. 6 which shows the control circuit 51, the burst signal Bc which comes from the AFC-APC circuit 71 of FIG. 4 is supplied to one of the input terminals of a phase comparison circuit 86 disposed within the control circuit 51. Another input terminal of the circuit 86 receives a signal Bd which is of the same frequency as that of the burst signal and is produced from a voltage controlled signal generating circuit (VCO) 87. The phase comparison circuit 86 is arranged to compare the phases of the two input signals and produces a control voltage signal representing a phase difference between the two input signals. This control voltage signal is applied to the VCO 87 to control the phase of its output in such a way as to attain coincidence in phase between the two input signals. The phase controlled signal Bb which is produced from the VCO 87 is supplied to the burst gate circuit 88. As mentioned above, the burst gate circuit 88 receives also the burst gate pulse signal Bb which is as shown in FIG. 8(*g*). The burst gate circuit 88 is arranged to gate the signal Bd when the burst gate pulse signal Bb is at a low level and to allow the former to pass there when the latter is at a high level. The signal Bd which is thus allowed to pass is supplied to the quadrature two-phase modulation circuit 90 and the frequency multiplexing circuit 91 of FIG. 4. The period of time T7 set at the MM 84 coincides with a period between the fall of the synchronizing signal of the reproduced video signal and the beginning of the burst signal. The time T8 set at the MM 85 coincides with a period during which the burst signal is inserted in the reproduced video signal. The synchronizing signal SyncC which is supplied to the control circuit 51 is supplied also to an MM 76. The MM 76 is arranged to delay the fall trigger of the synchronizing signal SyncC by a period of time T9. The fall trigger signal delayed by the MM 76 is supplied to the set terminal S of an FF circuit 77. This signal brings the output of the FF circuit 77 into a high level state. The reset terminal R of the FF circuit 77 receives the above stated blanking pulse signal BLK. The output level of the FF circuit 77 becomes low when the output is reset by the rise trigger of the blanking pulse signal BLK. Therefore, the signal produced from the FF circuit 77 becomes a switch control signal Sw which is as shown in FIG. 8(*i*). The switch control signal Sw is supplied to the switch circuit 50 to control the switching action of the circuit 50. More specifically, the circuit 50 allows the luminance signal Y and color difference signals R-Y and B-Y which come from the camera part to the input terminals "a", "b" and "c" to be produced therefrom while the switch control signal Sw is at a low level; and allows the luminance signal Y and the color difference signals R-Y and B-Y coming from the reproduction system of the VTR to the input terminals "d", "e" and "f" to be produced while the switch control signal Sw is at a high level. Further, the period of time T9 set at the MM 76 corresponds to the blanking period of the reproduced video signal.

As described above, the various signals formed by the control circuits 51 are supplied to applicable circuits at the timing as shown in FIGS. 8(*a*) to 8(*j*). In the case of the wipe action, the reproduced video signal and the sensed image video signal which are supplied to the switch circuit 50 are allowed to be supplied in a time sharing manner to the blanking circuit 89 in accordance with the switch control signal Sw. The blanking circuit 89 defines a blanking period for the video signal received in accordance with the blanking pulse signal BLK received from the control circuit 51. In the video signal thus produced, the color difference signals R-Y and B-Y are quadrature two-phase modulated into a carrier chrominance signal C at the quadrature two-phase modulation circuit 90 using the burst signal Bd supplied from the control circuit 51. The carrier chrominance signal C which is thus obtained is supplied together with the luminance signal Y to the frequency multiplexing circuit 91. At the circuit 91, the synchronizing signal SyncB and the burst signal Bd which are received from the control circuit 91 are inserted during the above stated blanking period. As a result, a video signal processed by the wipe action as shown in FIG. 8(*i*) is obtained and produced from an output terminal 74 via a change-over switch 73 which is on its connecting side H.

Further, with respect to the picture obtained from the video signal produced from the output terminal 74, the time sharing ratio between the video signal corresponding to the reproduced picture and the video signal corresponding to the sensed image picture is controlled by the switch control signal Sw produced from the control circuit 51. The switch control signal Sw is formed within the control circuit 51 according to the synchronizing signal SyncB. The signal SyncB has its delay time T3 set, as shown in FIG. 8(*e*), at a value according to the wipe control signal Ws which is set at a volume setting value obtained by operating and adjusting a volume (not shown) provided on the operation part 52. Therefore, the time sharing ratio for multiplexing between the video signal corresponding to the reproduced picture and the video signal corresponding to the sensed image picture can be set as desired.

In short, in the camera-combined type VTR, a special effect can be imparted without difficulty to a video signal to be reproduced by operating the camera part during reproduction by the VTR part; by multiplexing a sensed image video signal formed by the camera part and a video signal formed by the VTR part in a time sharing manner; and by controlling the time sharing and multiplexing ratio between these video signals.

Figure 9:
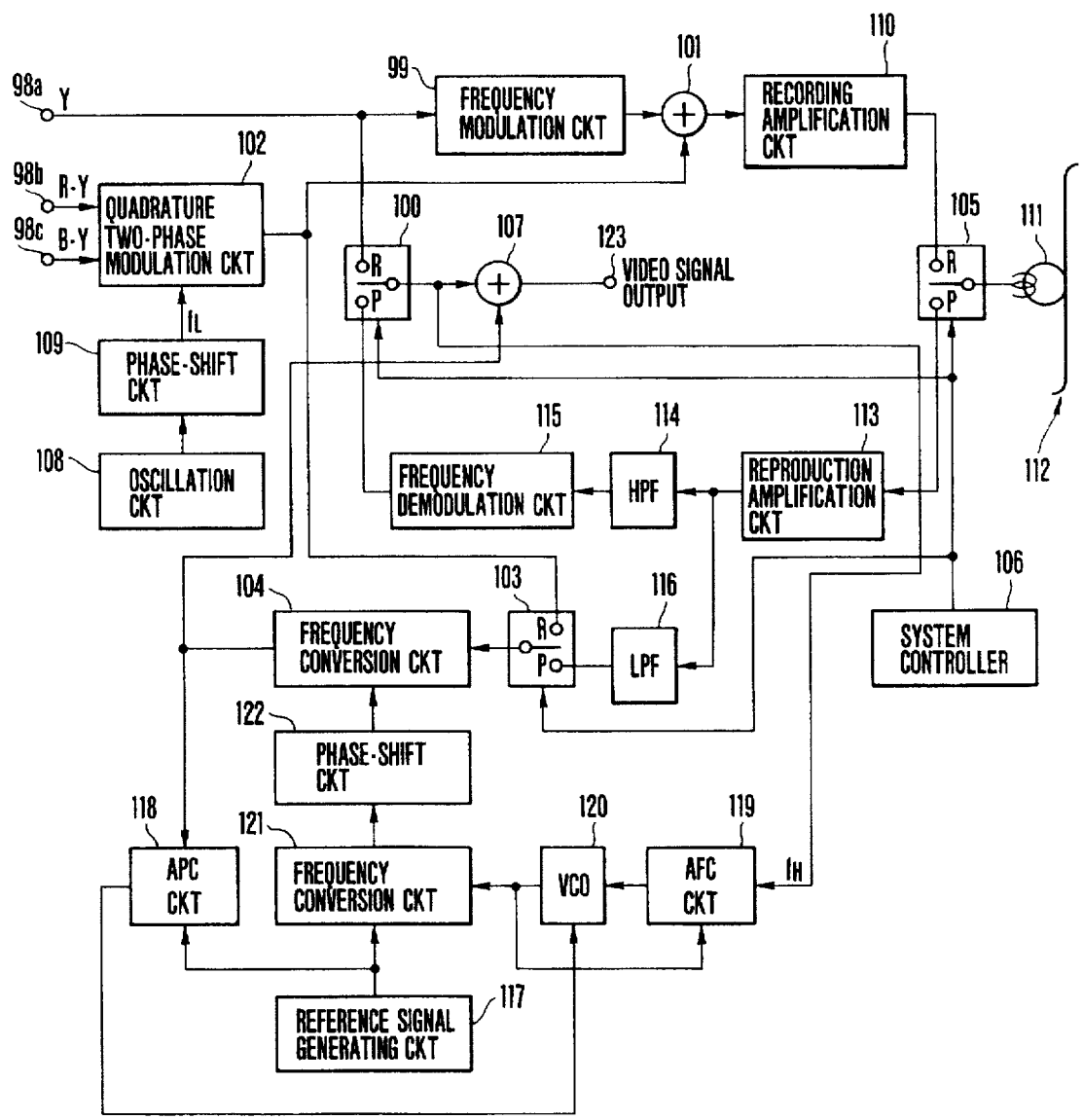
FIG. 9 is a diagram showing in outline the arrangement of the VTR part of a camera-combined type VTR to which this invention is applied as a third embodiment thereof.
Figure 10:
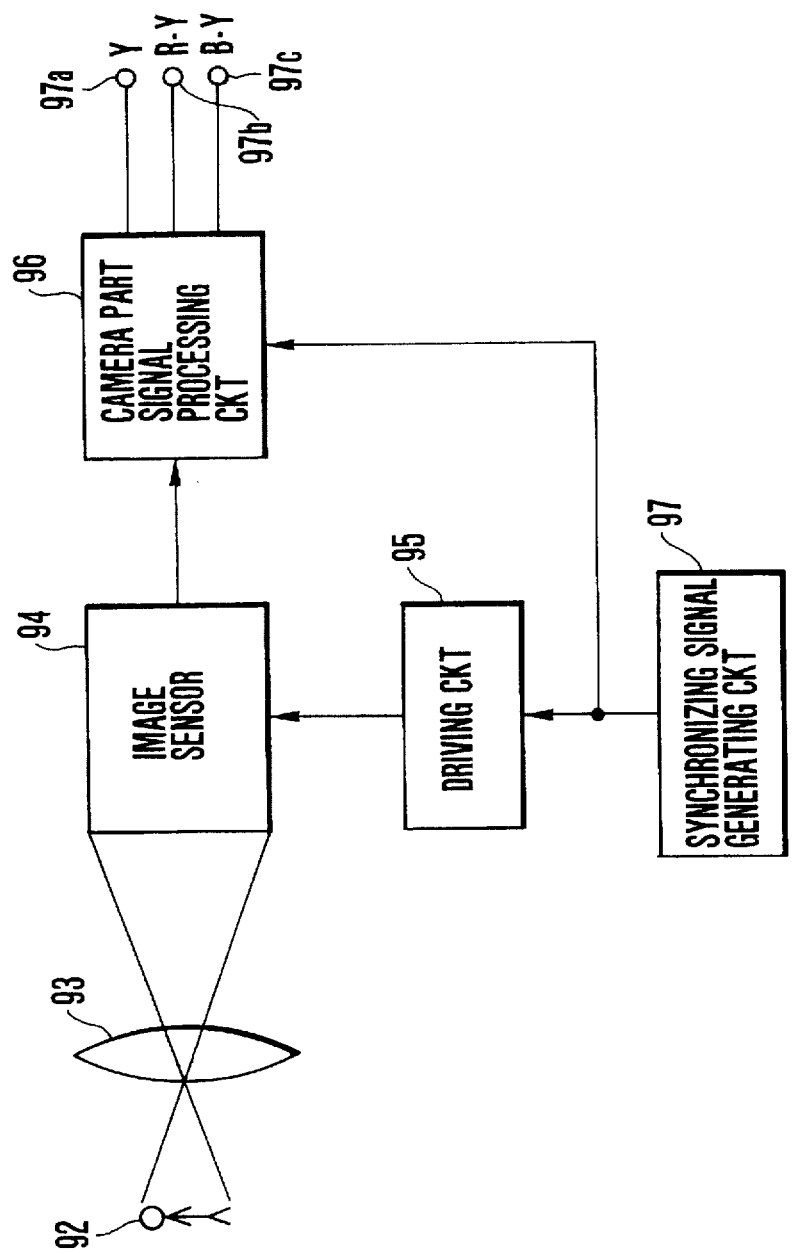
FIG. 10 is a diagram showing in outline the arrangement of the camera part of the third embodiment.

FIGS. 9 and 10 show in outline the arrangement of a camera-combined type VTR arranged as a third embodiment of this invention, FIG. 9 showing the VTR part and FIG. 10 the camera part thereof respectively.

The recording operation of the third embodiment is as follows: In the recording method employed in this case, the luminance signal included in a TV signal of the NTSC color system is frequency modulated; the carrier chrominance signal included in the TV signal is converted to a lower frequency band; and these signals are frequency multiplexed. However, any other recording method can be employed in accordance with this invention, as long as the color video signal is recorded on a recording medium after conversion of the frequency band of the chrominance signal component. Referring to FIG. 10, the image of an object 92 is formed, as an optical image, via an image pickup lens 93 on the image sensing surface of an image sensor 94. The image sensor 94 is driven by driving pulses produced from a driving circuit 95. The sensor 94 then supplies a camera part signal processing circuit 96 with a signal representing the optical image of the object 92 formed on the image sensing surface thereof.

The driving circuit 95 receives horizontal and vertical synchronizing signals produced from a synchronizing signal generating circuit 97. The driving circuit 95 generates the driving pulses in synchronism with the synchronizing signals. The camera part signal processing circuit 96 includes a sample-and-hold circuit and a matrix circuit. The circuit 96 is thus arranged to form a luminance signal Y and color difference signals R-Y and B-Y according to the optical image of the object 92 from the signal produced by the image sensor 94. These signals Y, R-Y and B-Y are supplied to the VTR part shown in FIG. 9 via output terminals 97a, 97b and 97c.

Referring to FIG. 9, the VTR part receives the luminance signal Y and the color difference signals R-Y and B-Y formed by the camera part. These signals are supplied to the input terminals 98a, 98b and 98c of the VTR part. In the VTR part, the luminance signal Y which comes to the input terminal 98a is supplied to a frequency modulation circuit 99 and also to one connecting side R of a change-over switch 100. The output of the switch 100 is arranged to be supplied to one of the input terminals of a frequency multiplexing circuit 101. Another connecting side P of the switch 100 is arranged to receive a reproduced luminance signal from a frequency demodulation circuit 115 of the reproduction system of the VTR part.

The color difference signals R-Y and B-Y which come to the input terminals 98b and 98c are supplied to a quadrature two-phase modulation circuit 102. The output of the circuit 102 is arranged to be supplied to the frequency multiplexing circuit 101 and also to one connecting side R of a change-over switch 103. Another connecting side P of the switch 103 is arranged to receive a reproduced low-band converted carrier chrominance signal produced from an LPF 116. The output of the change-over switch 103 is arranged to be supplied to a frequency conversion circuit 104.

During a recording operation, the connecting positions of change-over switches 100, 103 and 105 are shifted to their sides R by a system controller 106. As stated above, the luminance signal Y coming from the camera part via the input terminal 98a is supplied to the frequency multiplexing circuit 107 via the switch 100 as well as to the frequency modulation circuit 99, and the color-difference signals R-Y and B-Y are supplied to the quadrature two-phase modulation circuit 102. The frequency modulation circuit 99 frequency modulates the luminance signal Y into a frequency modulated luminance signal YFM. The signal YFM is supplied to the frequency multiplexing circuit 101. An oscillation circuit 108 is arranged to produce a signal fL which is of a frequency, for example, of 743 KHz (in the event of an 8 mm VTR). The signal fL is phase shifted, for the purpose of performing the known azimuth recording, by a phase shift circuit 109 and is then supplied to the above stated quadrature two-phase modulation circuit 102. The circuit 102 quadrature two-phase modulates the phase shifted signal fL with the color difference signals R-Y and B-Y which are received from the camera part signal processing circuit 96 and thus forms a low-band carrier chrominance signal. The low-band carrier chrominance signal is supplied to the frequency multiplexing circuit 101 and to the connecting side R of the switch 103.

The frequency multiplexing circuit 101 frequency multiplexes the frequency modulated luminance signal from the frequency modulation circuit 99 and the low-band carrier chrominance signal from the quadrature two-phase modulation circuit 102. The output of the circuit 101 is a magnetic recording TV signal of the NTSC system to be magnetically recorded by the multiplex recording method of frequency modulating the luminance signal and low band converting the chrominance signal. The recording signal thus obtained is amplified to a given amplitude by a recording amplification circuit 110. The output of the circuit 110 is recorded on a magnetic tape 112 by a magnetic head 111 via the change-over switch 105 the connecting position of which is on the side R thereof. Other circuit elements which are not illustrated but are disposed in suitable parts of the VTR part include: An automatic gain control (AGC) circuit which is arranged to automatically adjust the peak-to-peak (pp) value of the amplitude of the luminance signal to a reference value; a circuit which is arranged to perform a pre-emphasizing process during frequency modulation; a circuit which is arranged to add a color burst signal to the chrominance signal; a chrominance signal amplitude automatic adjusting circuit (ACC) which is arranged to adjust the pp value of the chrominance signal to a reference value.

The reproducing operation of the third embodiment is as follows: For a reproducing operation, the system controller 106 shifts the connecting positions of the change-over switches 100, 103 and 105 to their sides P. A signal reproduced from the magnetic tape 112 by the magnetic head 111 is supplied via the switch 105 to a reproduction amplification circuit 113 to be amplified to a suitable degree. A high-pass filter (HPF) 114 extracts a frequency modulated luminance signal from the output of the reproduction amplification circuit 113. The output of the HPF 114 is demodulated into a luminance signal by a frequency demodulation circuit 115. The luminance signal is supplied to the frequency multiplexing circuit 107 via the change-over switch 100 which is on the connecting side P thereof.

A low-pass filter (LPF) 116 extracts a low-band carrier chrominance signal from the output of the reproduction amplification circuit 113. The output of the LPF 116 is applied to the frequency conversion circuit 104 via the change-over switch 103 which is on its side P. Meanwhile, a frequency conversion circuit 121 is arranged to form a signal of a frequency fsc+fL from a reference signal of a frequency fsc generated by a reference signal generating circuit 117 and the outputs of an APC circuit 118, an AFC circuit 119 and a VCO circuit 120. The signal of the frequency fsc+fL which is thus obtained is supplied to a phase shift circuit 122 which operates in the same manner as the above stated phase shift circuit 109 and supplies the output thereof to the frequency conversion circuit 104. The circuit 104 frequency converts the low-band carrier chrominance signal which is separated by the LPF 116 into a carrier chrominance signal C by using the output of the phase shift circuit 122. The signal C is supplied to the frequency multiplexing circuit 107. The automatic phase and frequency control performed by means of the APC circuit 118, the AFC circuit 119 and the VCO circuit 120 is well known. Therefore, the details of it are omitted from description herein. The AFC circuit 119 obtains a horizontal synchronizing signal fH from the luminance signal produced from the frequency demodulation circuit 115 and performs frequency control thereby. The APC circuit 118 performs phase control by means of a color burst signal included in the carrier chrominance signal C obtained from the frequency conversion circuit 104.

The reproduction circuit system is further arranged to perform other actions including, among others: a drop-out compensating action, a noise canceling action, an edge emphasizing action and time base correcting action, though they are omitted from the description given here.

The frequency multiplexing circuit 107 forms a composite video signal by frequency multiplexing the luminance signal Y supplied from the frequency demodulation circuit 115 and the carrier chrominance signal C supplied from the frequency conversion circuit 104. The composite video signal is then produced from an output terminal 123 to have the signal from the magnetic tape 112 thus turned into a picture on a monitor TV set or an electronic view finder. Further, the camera-combined type VTR arranged as the third embodiment of this invention permits monitoring the object image sensing state in a color picture during a recording operation.

In other words, the low-band carrier chrominance signal which is formed during a recording process at the quadrature two-phase modulation circuit 102 is supplied by the system controller 106 to the frequency conversion circuit 104 via the change-over switch 103 which is on its connecting side R. The low-band carrier chrominance signal from the circuit 102 is of the same signal form as the low-band carrier chrominance signal which is separated by the LPF 116 from the signal reproduced from the magnetic tape 112. Therefore, the low-band carrier chrominance signal obtained from the quadrature two-phase modulation circuit 102 is also converted into a carrier chrominance signal by the frequency conversion circuit 104 in the same manner as in the case of converting the low-band carrier chrominance signal obtained from the reproduced signal into a carrier chrominance signal during reproduction. The carrier chrominance signal from the circuit 102 is supplied to the frequency multiplexing circuit 107. The circuit 107 also receives a luminance signal Y formed by the camera part from the input terminal 98a via the change-over switch 100 which is on its connecting side R during a recording operation. The luminance signal from the camera part and the carrier chrominance signal obtained from the low-band converted chrominance signal by frequency conversion are frequency multiplexed at the frequency multiplexing circuit 107. Then, the output of the circuit 107 is produced in the form of a composite video signal from the output terminal 123. The above stated arrangement, therefore, permits monitoring the object image sensing state during a recording process in the form of a color picture with the composite video signal supplied to a monitor TV set or an electronic view finder or the like which is not shown.

Further, in case where a sensed image video signal or a reproduced video signal is once divided into a luminance signal and a chrominance signal and then, after a predetermined signal processing operation, the luminance signal and the chrominance signal are again to be multiplexed, the phase relation between the luminance signal and the chrominance signal must be kept unvarying during these processes. To meet this requirement, the embodiment is of course suitably provided with some delay circuit for phase adjustment to be made as necessary.

While this invention has been described through the first to third embodiments in the foregoing, the possible applications of the invention is of course not limited to these embodiments. The same advantageous effects of the invention are likewise attainable with the invention applied to other apparatuses such as a camera-combined type still picture video system, etc.

What is claimed is:

1. An image signal processing apparatus for processing an image signal, comprising:
   (a) image sensing means for sensing an image of an object and for generating a motion-picture image signal corresponding to the sensed image of the object;
   (b) reproducing means for reproducing the motion-picture image signal from a recording medium on which motion-picture image signals generated by said image sensing means are recorded;
   (c) still-picture image signal holding means for extracting a still-picture image signal for the amount of one picture from the motion-picture image signal reproduced by said reproducing means, holding temporarily and thereby outputting the still-picture image signal thus extracted; and
   (d) synthesizing image signal forming means for receiving in parallel the motion-picture image signal generated by said image sensing means and the still-picture image signal outputted from said still-picture image signal holding means, and forming a synthesized image signal by synthesizing the motion-picture image signal and still-picture image signal thus received to be outputted thereafter.

2. An apparatus according to claim 1, wherein said image signal processing apparatus represents a camera-combined type recording/reproducing apparatus.

3. An apparatus according to claim 1, wherein said still-picture image signal holding means includes a memory.

4. An apparatus according to claim 1, wherein said synthesizing image signal forming means is arranged, when the motion picture image signal generated by said image sensing means and the still-picture image signal outputted from said still-picture image signal holding means are synthesized, to perform a synthesizing process which causes the ratio of the motion-picture image signal and the still-picture image signal to vary with lapse of time.

5. An apparatus according to claim 1, wherein said synthesizing image signal forming means is arranged to form a synthesizing image signal by time-division-synthesizing the motion-picture image signal generated by said image sensing means and the still-picture image signal outputted from said still-picture image signal holding means, and when the motion-picture image signal generated by said image sensing means and the still-picture image signal outputted from said still-picture image signal holding means are time-division-synthesized, to perform a time-division-synthesizing process which causes the ratio of the motion-picture image signal and the still-picture image signal to vary with lapse of time.

6. An apparatus according to claim 1, wherein said synthesizing image signal forming means is arranged to allocate respectively on two continuous regions occupying a whole monitor screen the two signals which are respectively represented by the motion-picture image signal generated by said image sensing means and the still-picture image signal outputted from said still-picture image signal holding means, to form a synthesizing image signal by time-division-synthesizing the motion-picture image signal generated by said image sensing means and the still-picture image signal outputted from said still picture image signal holding means, and when the motion picture image signal and the still picture image signal are respectively allocated in the two continuous regions occupying the whole monitor screen and are time-division synthesized, to perform a time-division-synthesizing process which causes the ratio of the two regions occupying the whole monitor screen for said two images allocated thereon to vary with lapse of time.

7. An apparatus according to claim 1, wherein said synthesizing image signal forming means is arranged to form a synthesizing image signal by performing a wipe effect through the use of a motion-picture represented by the motion-picture image signal generated by said image sensing means and a still picture represented by the still-picture image signal outputted from said still-picture image signal holding means.

8. An apparatus according to claim 1, wherein said synthesizing image signal forming means includes selection output means to receive the motion-picture image signal generated by said image sensing means and the still-picture image signal outputted from said still-picture image signal holding means, and to output either the motion-picture image signal or the still-picture image signal thus received.

9. An apparatus according to claim 1, wherein a still-picture image signal for the amount of one picture, said still-picture image signal being extracted from the motion-picture image signal which is reproduced by said reproducing means in said still-picture image signal holding means, stands for one representing a multi-value still picture.

10. An image signal processing apparatus for processing an image signal, comprising:

(a) image sensing means for sensing an image of an object and for generating a motion-picture image signal corresponding to the sensed image of the object;

(b) reproducing means for reproducing the motion-picture image signal from a recording medium on which motion-picture image signals generated by said image sensing means are recorded;

(c) still-picture image signal holding means for extracting a still-picture image signal for the amount of one picture from the motion-picture image signal reproduced by said reproducing means, and holding temporarily and thereby outputting the still-picture image signal thus extracted; and (d) special-effects-processed image signal forming means for receiving in parallel the motion-picture image signal generated by said image sensing means and the still-picture image signal outputted from said still-picture image signal holding means, forming a special-effects-processed image signal representing a special-effects-processed image signal on which special effects are processed, said special-effects-processed image changing gradually with the lapse of time from a still picture represented by the still-picture image signal thus received to a motion picture represented by the motion-picture image signal, and thereby outputting said special-effects-processed image signal thus formed.

11. An apparatus according to claim 10, wherein said image signal processing apparatus represents a camera-combined type recording/reproducing apparatus.

12. An apparatus according to claim 10, wherein said still-picture image signal holding means includes a memory.

13. An apparatus according to claim 10, wherein said special-effects-processed image signal forming means is arranged to form a special-effects-processed image signal by time-division synthesizing the motion-picture image signal generated by said image sensing means and the still-picture image signal outputted from said still-picture image signal holding means, and when the motion-picture image signal generated by said image sensing means and the still-picture image signal outputted from said still-picture image signal holding means are time-division synthesized, to perform a time-division-synthesizing process which causes the ratio of the motion-picture image signal and the still-picture image signal to vary with lapse of time.

14. An apparatus according to claim 10, wherein said special-effects-processed image signal forming means is arranged to allocate respectively on two continuous regions occupying a whole monitor screen the two signals which are respectively represented by the motion-picture image signal generated by said image sensing means and the still-picture image signal outputted from said still-picture image signal holding means, to form a synthesizing image signal by time-division-synthesizing the motion-picture image signal generated by said image sensing means and the still-picture image signal outputted from said still picture image signal holding means, and when the motion picture image signal and the still-picture image signal are respectively allocated on the two continuous regions occupying the whole monitor screen and are time-division synthesized, to perform a time-division synthesizing process which causes the ratio of the two regions occupying the whole monitor screen for said two images allocated thereon to vary with lapse of time.

15. An apparatus according to claim 10, wherein said special-effects-processed image signal forming means is arranged to form a special-effects-processed image signal by performing a wipe effect which causes a scene to change gradually with the lapse of time from a still picture represented by the still-picture image signal outputted from said still-picture image signal holding means to a motion picture represented by the motion-picture image signal generated by said image sensing means.

16. An apparatus according to claim 10, wherein said special-effects-processed image signal forming means includes selection output means to receive the motion-picture image signal generated by said image sensing means and the still-picture image signal outputted from said still-picture image signal holding means and to output either the motion-picture image signal or the still-picture image signal thus received.

17. An apparatus according to claim 10, wherein a still-picture image signal for the amount of one picture, said still-picture image signal being extracted from the motion-picture image signal which is reproduced from said reproducing means in said still-picture image signal holding means, stands for one representing a multi value still picture.

* * * * *